United States Patent
Petsch

(10) Patent No.: US 12,491,818 B2
(45) Date of Patent: Dec. 9, 2025

(54) SHORT-CIRCUIT FAULT-DETECTING LIGHTING DEVICE FOR A MOTOR VEHICLE

(71) Applicant: ZKW Group GmbH, Wieselburg (AT)

(72) Inventor: Daniel Petsch, Gaming (AT)

(73) Assignee: ZKW Group GmbH, Wieselburg (AT)

( * ) Notice: Subject to any disclaimer, the term of this patent is extended or adjusted under 35 U.S.C. 154(b) by 137 days.

(21) Appl. No.: 18/283,577

(22) PCT Filed: Mar. 1, 2022

(86) PCT No.: PCT/EP2022/055044
§ 371 (c)(1),
(2) Date: Sep. 22, 2023

(87) PCT Pub. No.: WO2022/207209
PCT Pub. Date: Oct. 6, 2022

(65) Prior Publication Data
US 2024/0166130 A1     May 23, 2024

(30) Foreign Application Priority Data
Mar. 29, 2021   (EP) .................................... 21165642

(51) Int. Cl.
| B60Q 11/00 | (2006.01) |
| H05B 45/50 | (2022.01) |
| H05B 45/58 | (2020.01) |

(52) U.S. Cl.
CPC ........... *B60Q 11/005* (2013.01); *H05B 45/58* (2020.01)

(58) Field of Classification Search
CPC ........ H05B 45/30; H05B 45/50; H05B 45/54; H05B 45/58; H05B 47/20; H05B 47/23; B60Q 11/00; B60Q 11/002; B60Q 11/005
See application file for complete search history.

(56) References Cited

U.S. PATENT DOCUMENTS

| 8,843,331 B2 * | 9/2014 | Irissou ................... | H05B 45/58 |
| | | | 702/58 |
| 9,894,731 B2 * | 2/2018 | Kovatchev ............. | H05B 45/48 |
| (Continued) | | | |

FOREIGN PATENT DOCUMENTS

| AT | 515546 B1 | 10/2015 |
| DE | 102008008217 A1 | 8/2008 |
| JP | 2019079772 A | 5/2019 |

OTHER PUBLICATIONS

Extended European Search Report for European Patent Application No. 21165642.6 dated Aug. 25, 2021 (10 Pages).

(Continued)

*Primary Examiner* — Thai Pham
(74) *Attorney, Agent, or Firm* — Eversheds Sutherland (US) LLP

(57) ABSTRACT

The invention relates to a short-circuit fault detection illumination device (1) for a motor vehicle headlight, comprising
 a voltage input (SE) and a terminal (ME) for connection to earth potential,
 a power branch (LS) supplied via the voltage input (SE), which comprises a number of light sources (2) to be monitored, wherein this number is at least two, wherein the light sources (2) are designed to emit the light of the illumination device (1) and the light sources (2) are connected to one another in series within the power branch (LS),
wherein the illumination device (1) further
 has an auxiliary branch (HS) with transistors (3) arranged therein and connected to one another in series, wherein each light source (2) of the power branch (LS) is associated with one of the transistors (3), and thus a monitoring pair (P1, P2, P3, P4), consisting of a light source (2) to be monitored and a transistor (3) assigned for monitoring, is formed, wherein each transistor (3) is coupled to the cathode and anode of the light source (2) in such a manner that the voltage that drops across the light source (2) in normal operation is used to connect the transistor (3), and in the event of a short circuit of the light source (2), the voltage drop caused by the short circuit leads to a blocking of the transistor (3) and (Continued)

Figure 1:
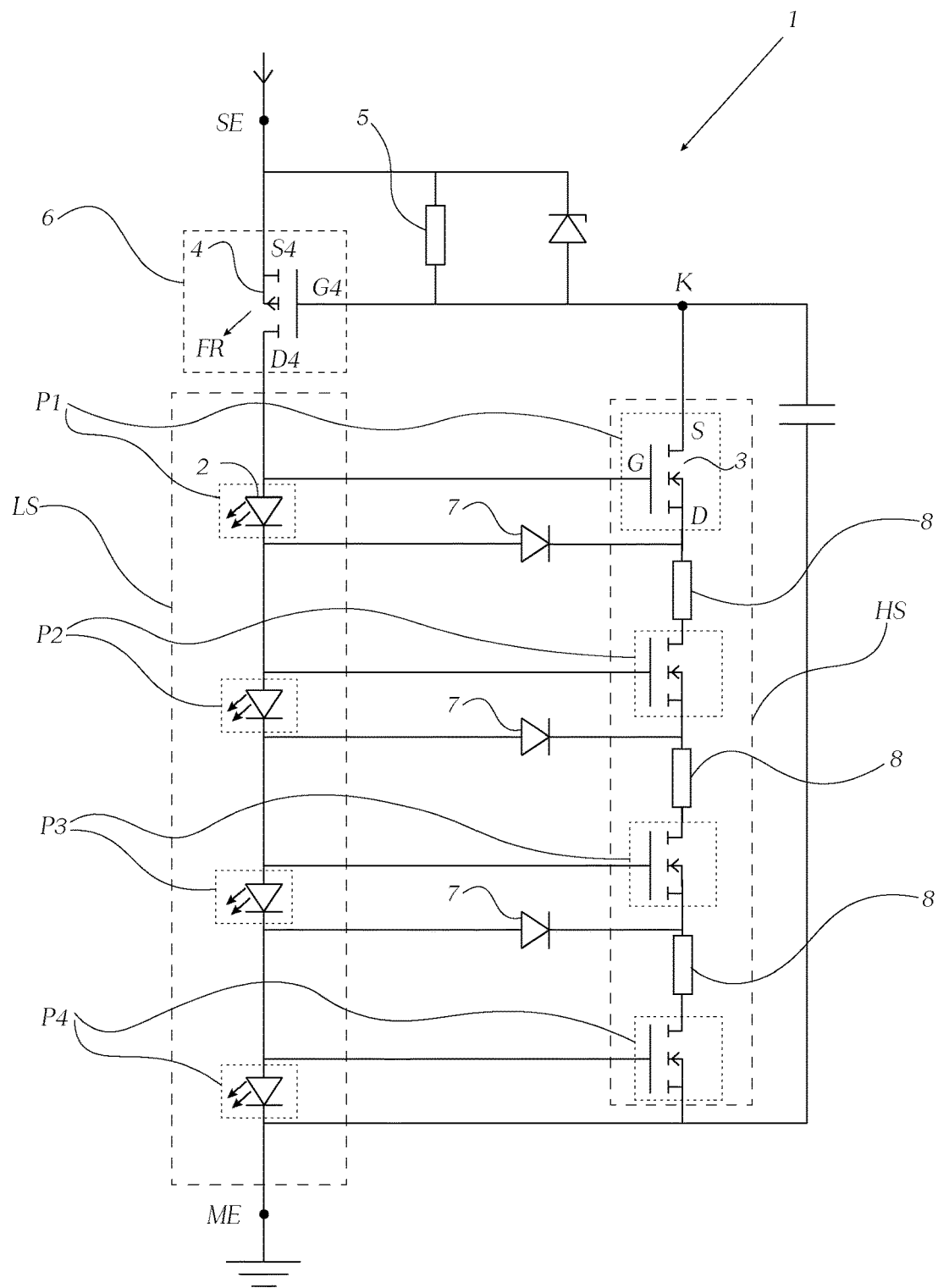

thus of the auxiliary branch (HS), wherein the short-circuit fault detection illumination device (1) further has a fault detection device (6) coupled to the auxiliary branch (HS), which is designed to output an error signal (SF) or trigger an error routine (FR) in the event of the auxiliary branch being blocked.

13 Claims, 6 Drawing Sheets

(56) References Cited

U.S. PATENT DOCUMENTS

| | | | | |
|---|---|---|---|---|
| 10,178,734 | B1* | 1/2019 | Moumen | H05B 45/48 |
| 11,395,395 | B2* | 7/2022 | Park | H05B 45/44 |
| 2007/0159750 | A1* | 7/2007 | Peker | H05B 45/22 |
| | | | | 361/93.1 |
| 2014/0327359 | A1* | 11/2014 | Masazumi | H10K 59/86 |
| | | | | 315/122 |
| 2017/0331272 | A1* | 11/2017 | Nakatani | H02H 1/0007 |
| 2018/0049301 | A1* | 2/2018 | Brombach | B60Q 11/005 |
| 2018/0263088 | A1* | 9/2018 | Liang | H05B 45/54 |
| 2019/0098710 | A1* | 3/2019 | Murakami | H05B 45/50 |

OTHER PUBLICATIONS

International Search Report and Written Opinion for International Patent Application No. PCT/EP2022/055044 dated May 19, 2022 (16 Pages).

* cited by examiner

SHORT-CIRCUIT FAULT-DETECTING LIGHTING DEVICE FOR A MOTOR VEHICLE

The invention relates to a short-circuit fault detection illumination device for a motor vehicle headlight, comprising a voltage input and a terminal for connection to earth potential, and a power branch supplied via the voltage input, which comprises a number of light sources to be monitored, wherein the light sources are designed to emit the light of the illumination device and the light sources are connected to one another in series within the power branch.

Until now, it was common practice in the automotive industry to only check illumination devices provided for headlights for a certain type of failure, namely one where a failure of one or more light sources results in an interruption in the electrical connection that can be established by the light source in the normal state. It is generally known that, for example, incandescent lamps, halogen lamps, xenon lamps but also semiconductor components, such as LEDs, typically become non-conductive in the event of a failure, i.e. there is no current conduction via the light source. If several light sources are connected in series and one of the light sources fails, this causes the light source to be non-conductive, which in turn causes a failure of the entire light source string and thus also disables functioning light sources connected in series.

However, a second type of failure can occur, namely a failure of a light source, which manifests itself in a short circuit of the same. This type of fault was rare in the past, which is why no special measures for detecting short circuits of light sources have previously been implemented in the automotive industry. Up to now, only the type of fault mentioned above has been tested by inferring the functionality of an illumination device through the loss of current (through electrical non-conductivity of the light source caused by failure).

It has transpired that the use of modern light sources results in faults of the second type, i.e. short circuit faults, more frequently. As a rule, when this occurs, no light is emitted from the light source affected by the short circuit. However, the other serially upstream or downstream light sources can still be supplied with power. Such failures negatively change the light image emitted by the illumination device. One object of the invention is to create an illumination device that is as reliable as possible and which makes it possible to check the operation of the illumination device and, if necessary, to implement measures, such as a fault warning and/or fault routines.

This object is achieved with an illumination device of the type mentioned in the introduction, which, according to the invention, has an auxiliary branch with transistors arranged therein and connected to one another in series, wherein each light source of the power branch is associated with one of the transistors, and thus a monitoring pair, consisting of a light source to be monitored and a transistor assigned for monitoring, is formed, wherein each transistor is coupled to the cathode and anode of the light source in such a manner that the voltage that drops across the light source in normal operation is used to connect the transistor, and in the event of a short circuit of the light source, the voltage drop caused by the short circuit leads to a blocking of the transistor and thus of the auxiliary branch, wherein a fault detection device coupled to the auxiliary branch is provided, which is designed to output an error signal and/or trigger an error routine in the event of the auxiliary branch being blocked.

If a light source of a light source string is therefore short-circuited due to a fault, only the string voltage decreases in the case of supply via a current source. Due to the monitoring by means of transistors, however, the short-circuit fault can be detected and, if necessary, reported back despite continued operation (and thus avoidance of a total failure or switching off of the power branch). The light sources can, for example, be LED light sources. The phrasing "for connection to earth potential" does not mean that the terminal in question must necessarily be connected to earth potential. A person skilled in the art knows that only a corresponding voltage difference between the voltage input and the terminal for connection to earth is required in order to electrically operate the illumination device. The reference potentials themselves are basically irrelevant. This means that the terminal does not have to be connected to earth, but rather only that the connection to earth should be possible. The number of light sources is, for example, at least 2, 3 or 4, but can be considerably higher and can be determined by a person skilled in the art depending on the respective application.

In particular, it can be provided that the fault detection device is designed to carry out a fault routine, in which the operation of the light sources is automatically switched off if a fault is detected, wherein it is provided that both the power branch and the auxiliary branch extend between the voltage input and the earth terminal and the fault detection device is designed as a main switch, which is arranged in series with the power branch and is coupled to the auxiliary branch in such a way that if the auxiliary branch is connected, the main switch is electrically conductive and, if the auxiliary branch is blocked, it is electrically blocking. In this way, it can be prevented, for example, that a sharp reduction in the light intensity of the illumination device, caused by the failure of several light sources of the power branch due to a short circuit of a light source, goes unnoticed and thus even falls below the legal minimum requirement for the illumination device, which also entails an increased risk for all road users.

Furthermore, it can be provided that the transistors of the auxiliary branch are designed as npn bipolar transistors, wherein an ohmic resistor is respectively connected in series between the transistors and in each monitoring pair, the light source and transistor are coupled by virtue of the fact that the anode of the light source is connected to the base of the transistor and the cathode of the light source is connected to the emitter of the transistor, wherein those connections that start from connection points located between light sources are respectively provided with a diode determining the power flow between the power branch and auxiliary branch, wherein the direction of flow of the diodes is switched for this purpose in the direction of the auxiliary branch in the form of the transistor of the respective monitoring pair, wherein the main switch is designed as a self-blocking P-channel MOSFET, which is electrically connected on the source side to the voltage input, on the drain side to the power branch and on the gate side to an end of the auxiliary branch on the voltage input side. This creates a reliable short-circuit fault detection illumination device that can be implemented at low cost. In a further development, it can be provided that the end of the auxiliary branch on the voltage input side is connected to the voltage input via an auxiliary ohmic resistor and an earth end of the auxiliary branch is connected to the earth terminal, wherein a node is formed between the auxiliary branch and the auxiliary ohmic resistor, which node is connected to the gate of the main switch in such a manner that if the auxiliary branch is blocked, the potential of the node is changed such that the main switch blocks and if the auxiliary branch is conductive, the potential of the node is changed such that the main switch conducts.

Alternatively, it can be provided that the transistors of the auxiliary branch are designed as self-blocking MOSFET transistors. In a further development, it can be provided that the transistors of the auxiliary branch are designed as self-blocking N-channel MOSFETs, wherein an ohmic resistor is respectively connected in series between the transistors and in each monitoring pair, the light source and transistor are coupled by virtue of the fact that the anode of the light source is directly connected to the gate of the transistor and the cathode of the light source is connected to the drain of the transistor, wherein those cathode connections that start from connection points located between light sources are respectively provided with a diode determining the power flow between the power branch and auxiliary branch, wherein the direction of flow of the diodes is switched for this purpose in the direction of the auxiliary branch in the form of the transistor of the respective monitoring pair, wherein the main switch is designed as a self-blocking P-channel MOSFET, which is electrically connected on the source side to the voltage input, on the drain side to the power branch and on the gate side to an end of the auxiliary branch on the voltage input side.

Furthermore, it can be provided that the end of the auxiliary branch on the voltage input side is connected to the voltage input via an auxiliary ohmic resistor and an earth end of the auxiliary branch is connected to the earth terminal, wherein a node is formed between the auxiliary branch and the auxiliary ohmic resistor, which node is connected to the gate of the main switch in such a manner that if the auxiliary branch is blocked, the potential of the node is changed such that the main switch blocks and if the auxiliary branch is conductive, the potential of the node is changed such that the main switch conducts.

Alternatively, it can be provided that the transistors of the auxiliary branch are designed as self-blocking P-channel MOSFETs, wherein an ohmic resistor is respectively connected in series between the transistors and in each monitoring pair, the light source and transistor are coupled by virtue of the fact that the anode of the light source is connected to the source of the transistor and the cathode of the light source is connected to the gate of the transistor, wherein those anode connections that start from connection points located between light sources are respectively provided with a diode determining the power flow between the power branch and auxiliary branch, wherein the direction of flow of the diodes is switched for this purpose in the direction of the power branch, wherein the main switch is designed as a self-blocking N-channel MOSFET, which is electrically connected on the source side to the earth terminal, on the drain side to the power branch and on the gate side to an end of the auxiliary branch on the earth terminal side. The phrase "anode connections" should be understood as those connections that lead from the anode of the respective light source to the respective transistor. In a further development, it can be provided that the end of the auxiliary branch on the earth terminal side is connected to the earth terminal via an auxiliary ohmic resistor and an end of the auxiliary branch on the voltage input side is directly connected to the voltage input, wherein a node is formed between the auxiliary branch and the auxiliary ohmic resistor, which node is connected to the gate of the main switch in such a manner that if the auxiliary branch is blocked, the potential of the node is changed such that the main switch blocks and if the auxiliary branch is conductive, the potential of the node is changed such that the main switch conducts.

Alternatively, it can be provided that the transistors of the auxiliary branch are designed as self-blocking P-channel MOSFETs, wherein an ohmic resistor is respectively connected in series between the transistors and in each monitoring pair, the light source and transistor are coupled by virtue of the fact that the anode of the light source is connected to the source of the transistor and the cathode of the light source is connected to the gate of the transistor, wherein those anode connections that start from connection points located between light sources are respectively provided with a diode determining the power flow between the power branch and auxiliary branch, wherein the direction of flow of the diodes is switched for this purpose in the direction of the power branch, wherein an end of the auxiliary branch on the earth terminal side is connected to the earth terminal via an auxiliary ohmic resistor and an end of the auxiliary branch on the voltage input side is directly connected to the voltage input, wherein a node is formed between the auxiliary branch and the auxiliary ohmic resistor, and the fault detection device is electrically connected to this node and thus detects a change in potential of the node caused by blocking or conductivity of the auxiliary branch and, depending thereon, outputs an error signal.

In a further development, it can be provided that the fault detection device comprises an auxiliary transistor, which is turned on depending on the potential of the node, wherein the auxiliary transistor is connected to an electrical control unit, also ECU, via a temperature-dependent resistor, wherein the electrical control unit detects the switching state of the auxiliary transistor and, depending thereon, outputs an error signal. The temperature-dependent resistor can, for example, be connected to a heat sink carrying the light sources and thus also be used for the temperature-dependent control of the light source current at the same time. This temperature-dependent resistor is therefore often structurally present for temperature measurement anyway and coupled with an ECU. Thanks to serial (or alternatively parallel) connection with the auxiliary transistor, a second functionality can thus be achieved via the temperature-dependent resistor in connection with the ECU.

In particular, it can be provided that the fault detection device comprises an auxiliary transistor, which is turned on depending on the potential of the node, wherein the switching state of the auxiliary transistor is used to output a binary error signal.

Furthermore, the invention relates to a motor vehicle headlight comprising an illumination device according to the invention.

Figure 2:
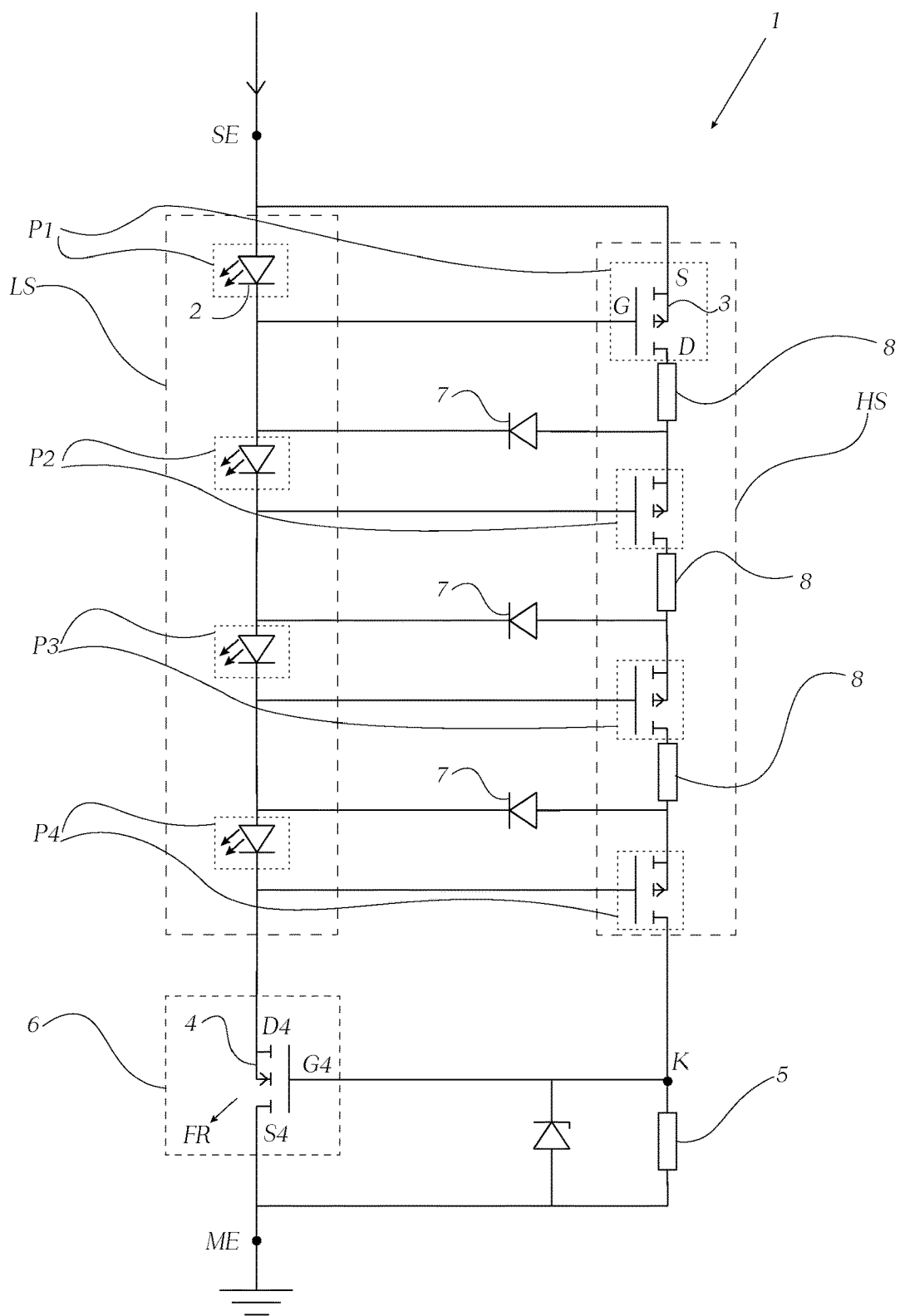
Figure 3:
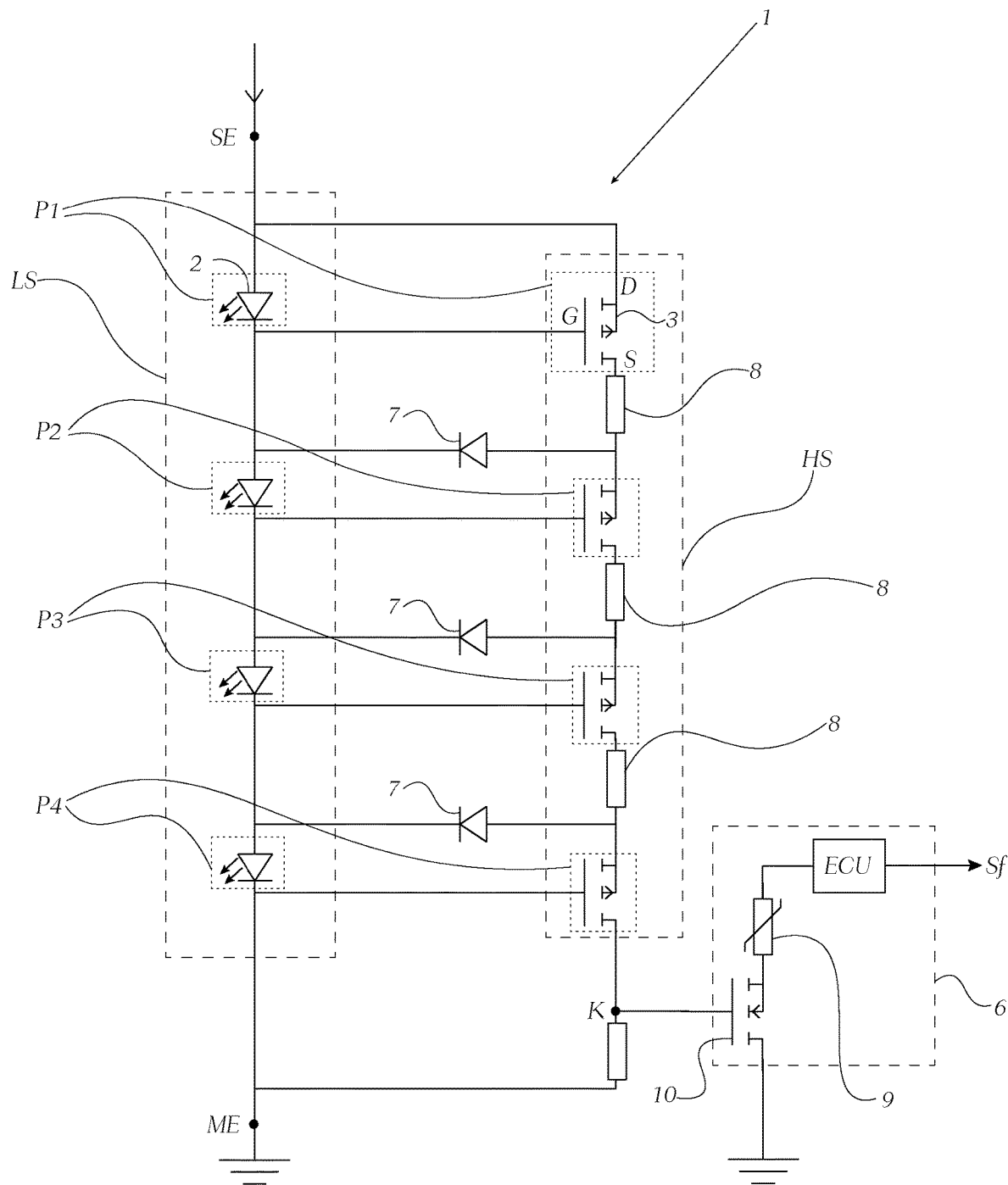
Figure 4:
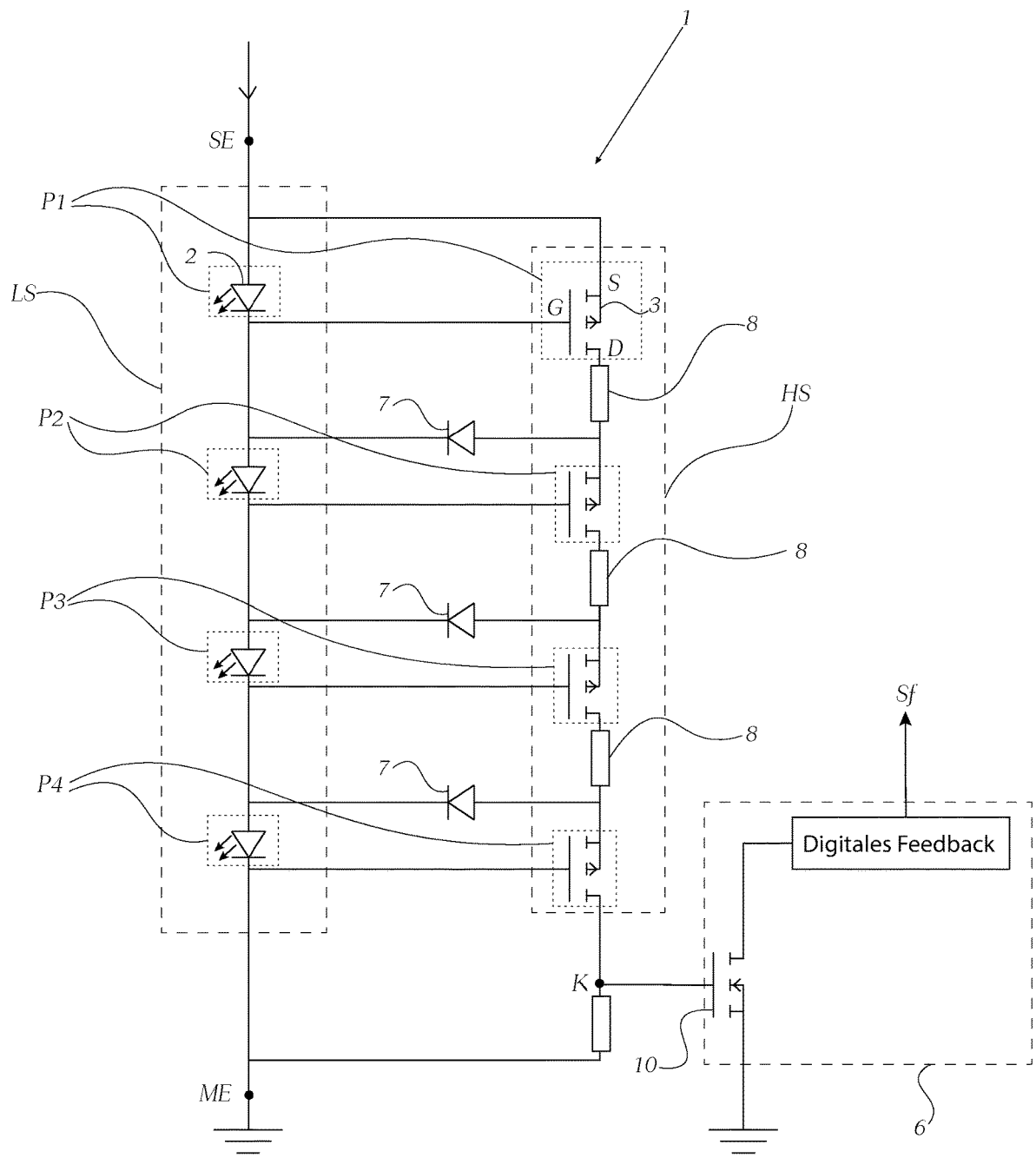
Figure 5:
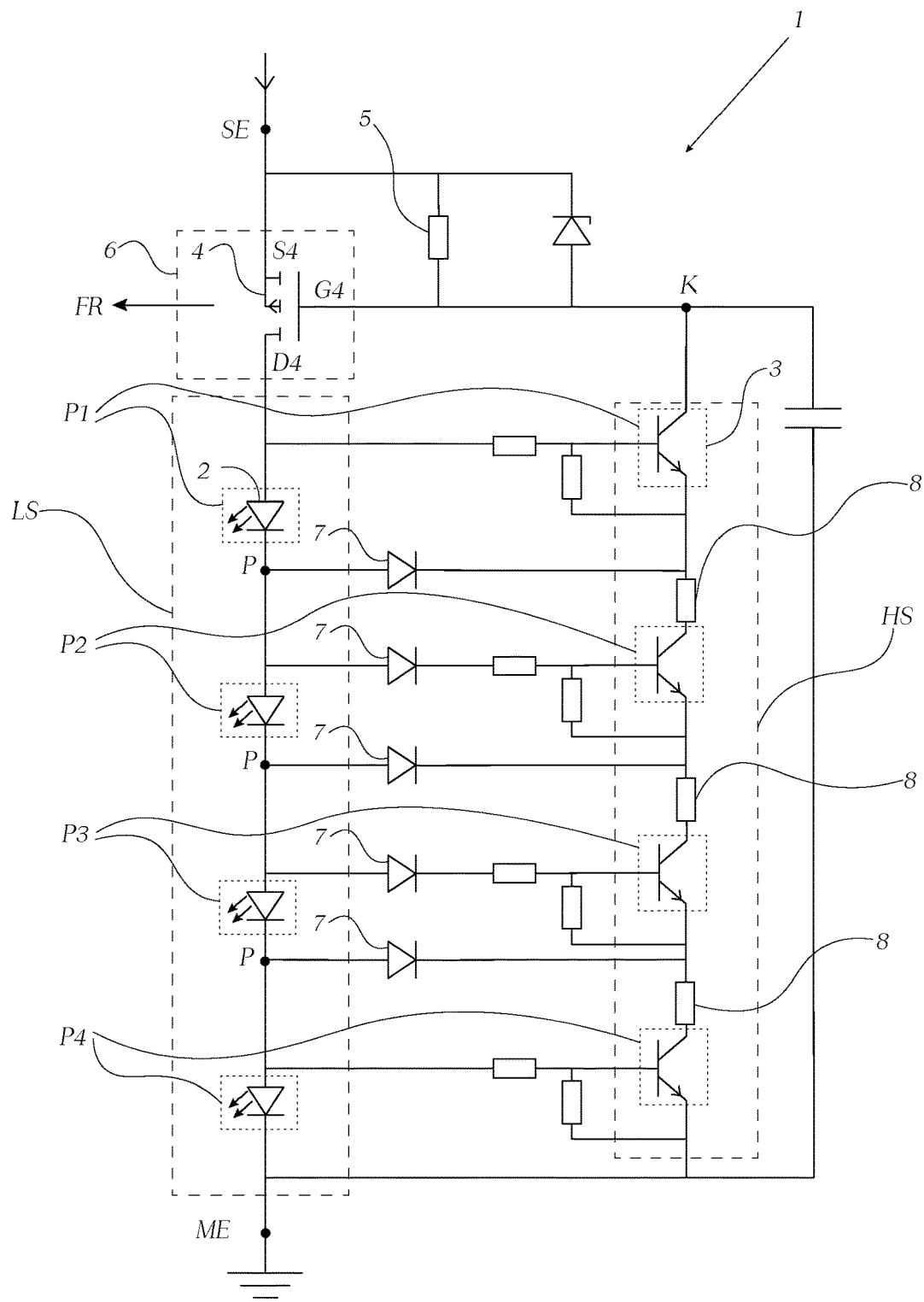
Figure 6:
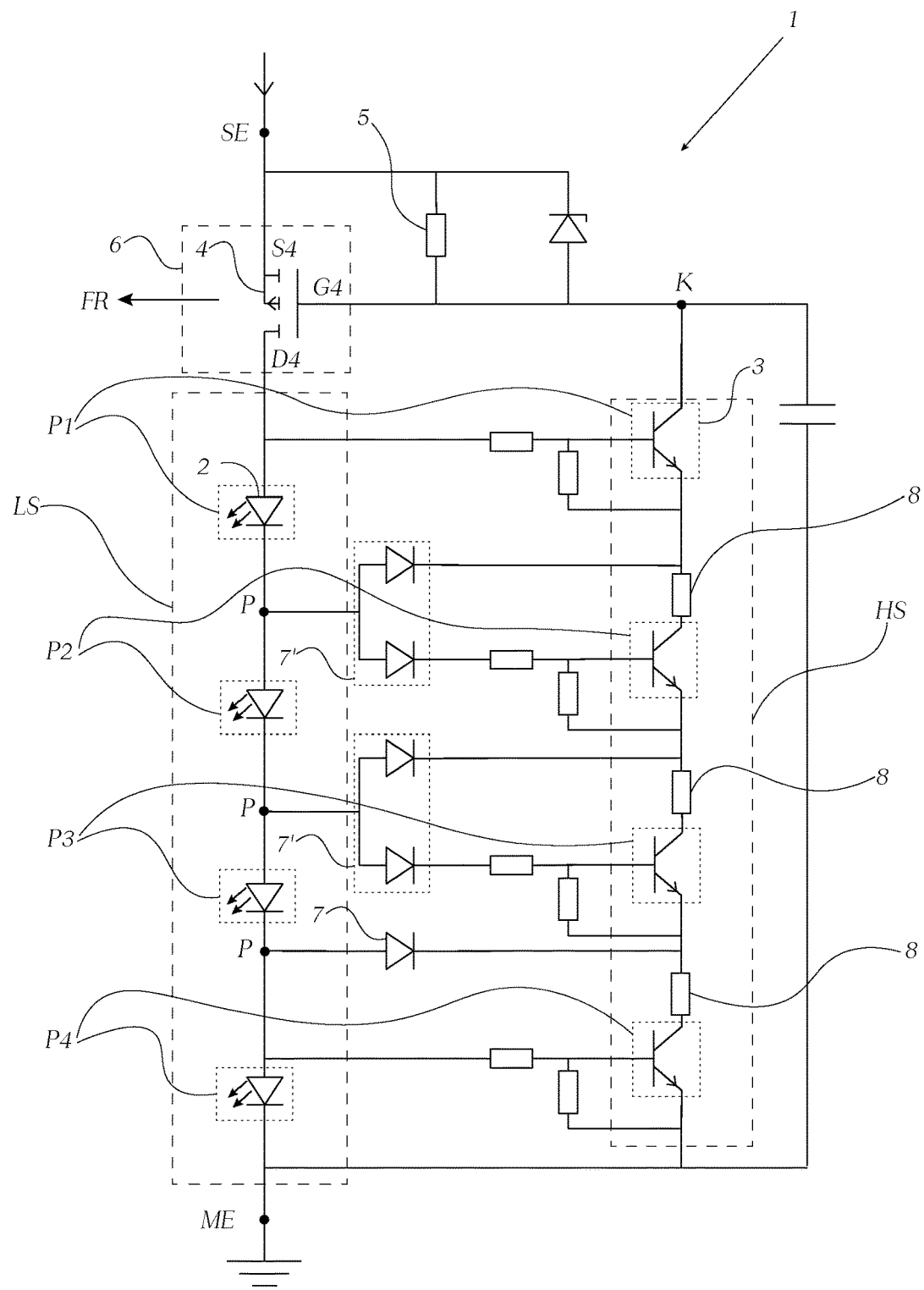

The invention is outlined in more detail below based on an exemplary and non-limiting embodiment, which is illustrated in the figures. In the figures FIG. 1 shows a schematic illustration of a first embodiment of the invention, FIG. 2 shows a schematic illustration of a second embodiment of the invention, FIG. 3 shows a schematic illustration of a third embodiment of the invention, FIG. 4 shows a schematic illustration of a fourth embodiment of the invention, FIG. 5 shows a schematic illustration of a fifth embodiment of the invention, and FIG. 6 shows a schematic illustration of a sixth embodiment of the invention.

In the following figures, unless otherwise stated, the same reference numbers denote the same features.

FIGS. 1 to 6 show a short-circuit fault detection illumination device 1 for a motor vehicle headlight, comprising a voltage input SE and a terminal ME for connection to earth potential. The illumination device 1 further comprises a power branch LS supplied via the voltage input SE, which comprises a number of light sources 2 to be monitored, wherein the light sources 2 are designed to emit the light of the illumination device 1 and the light sources 2 are connected to one another in series within the power branch LS.

The illumination device 1 further has an auxiliary branch HS with transistors 3 arranged therein and connected to one another in series. Each light source 2 of the power branch LS is associated with one of the transistors 3. This respectively forms a monitoring pair P1, P2, P3 or P4, which consists of a light source 2 to be monitored and a transistor 3 assigned to monitor same. For a better overview, only the light source and the transistor of the first monitoring pair P1 are given reference numbers.

With each monitoring pair, the transistor 3 is coupled to the cathode and anode of the associated light source 2 in such a manner that the voltage that drops across the light source 2 in normal operation is used to connect the transistor 3. In contrast, in the event of a short circuit of the light source 2, the voltage drop caused by the short circuit leads to a blocking of the transistor 3 and thus to the interruption of the current flow of the auxiliary branch HS. In addition, a fault detection device 6 coupled to the auxiliary branch HS is provided, which is designed to output an error signal $S_F$ (see FIGS. 3 and 4) or trigger an error routine FR (see remaining figures) in the event of the auxiliary branch HS being blocked.

A common feature of the embodiments according to FIGS. 1, 2, 5 and 6 is that the fault detection device 6 is designed to carry out a fault routine FR, in which the operation of the light sources 2 is automatically switched off if a fault is detected. It is provided that both the power branch LS and the auxiliary branch HS extend between the voltage input SE and the earth terminal ME and the fault detection device 6 is designed as a main switch 4. This main switch 4 is arranged in series with the power branch LS and is coupled to the auxiliary branch HS in such a way that if the auxiliary branch HS is connected, the main switch 4 is electrically conductive and, if the auxiliary branch HS is blocked, it is electrically blocking.

In the embodiments according to FIGS. 5 and 6, it is also provided that the transistors 3 of the auxiliary branch HS are designed as npn bipolar transistors. An ohmic resistor is respectively connected in series between the transistors 3. In each monitoring pair P1, P2, P3 and P4, the light source 2 and transistor 3 are coupled by virtue of the fact that the anode of the light source 2 is connected to the base of the transistor 3 and the cathode of the light source 2 is connected to the emitter of the transistor 3. Those connections that start from connection points P located between light sources 2 are respectively provided with a diode 7 determining the power flow between the power branch LS and auxiliary branch HS. This is understood to mean that the forward direction of the diode 7 is selected so that the power flow in one direction is determined accordingly. The direction of flow of the diodes 7 is oriented in the direction of the auxiliary branch HS for this purpose, namely towards the transistors 3 of the respective monitoring pair P1, P2, P3, P4. The main switch 4 is designed as a self-blocking P-channel MOSFET, which is electrically connected on the source side S4 to the voltage input SE, on the drain side D4 to the power branch LS and on the gate side G4 to an end of the auxiliary branch HS on the voltage input side. FIG. 6 differs from FIG. 5 through the use of so-called dual diodes 7', which are available at particularly low cost.

Furthermore, it is provided in the embodiment according to FIGS. 5 and 6 that the end of the auxiliary branch HS on the voltage input side is connected to the voltage input SE via an auxiliary ohmic resistor 5 and an earth end of the auxiliary branch HS is connected to the earth terminal ME, wherein a node K is formed between the auxiliary branch HS and the auxiliary ohmic resistor 5, which node is connected to the gate G4 of the main switch 4 in such a manner that if the auxiliary branch HS is blocked, the potential of the node K is changed such that the main switch 4 blocks and if the auxiliary branch HS is conductive, the potential of the node K is changed such that the main switch 4 conducts.

A common feature of the embodiments according to FIGS. 1 to 4 is that the transistors 3 of the auxiliary branch HS are designed as self-blocking MOSFET transistors.

In the embodiment according to FIG. 1, the transistors 3 of the auxiliary branch HS are designed as self-blocking N-channel MOSFETs, wherein an ohmic resistor 8 is respectively connected in series between the transistors 3 and in each monitoring pair P1, P2, P3, P4, the light source 2 and transistor 3 are coupled by virtue of the fact that the anode of the light source 2 is directly connected to the gate of the transistor 3 and the cathode of the light source 2 is connected to the drain of the transistor 3, wherein those cathode connections that start from connection points P located between light sources 2 are respectively provided with a diode determining the power flow between the power branch LS and auxiliary branch HS, wherein the direction of flow of the diodes is switched for this purpose in the direction of the auxiliary branch HS in the form of the transistor 3 of the respective monitoring pair P1, P2, P3, P4, wherein the main switch 4 is designed as a self-blocking P-channel MOSFET, which is electrically connected on the source side to the voltage input SE, on the drain side to the power branch LS and on the gate side to an end of the auxiliary HS branch on the voltage input side. In detail, it can be provided in the embodiment according to FIG. 1 that the end of the auxiliary branch HS on the voltage input side is connected to the voltage input SE via an auxiliary ohmic resistor 5 and an earth end of the auxiliary branch HS is connected to the earth terminal ME, wherein a node K is formed between the auxiliary branch HS and the auxiliary ohmic resistor 5, which node is connected to the gate G4 of the main switch 4 in such a manner that if the auxiliary branch HS is blocked, the potential of the node K is changed such that the main switch 4 blocks and if the auxiliary branch HS is conductive, the potential of the node K is changed such that the main switch 4 conducts. In this way, the power branch LS is automatically switched off as soon as there is a short circuit of a light source 2.

In FIG. 2, the transistors 3 of the auxiliary branch HS are designed as self-blocking P-channel MOSFETs, wherein an ohmic resistor is respectively connected in series between the transistors 3 and in each monitoring pair P1, P2, P3, P4, the light source 2 and transistor 3 are coupled by virtue of the fact that the anode of the light source 2 is connected to the source of the transistor 3 and the cathode of the light source 2 is connected to the gate of the transistor 3, wherein those anode connections that start from connection points P located between light sources 2 are respectively provided with a diode determining the power flow between the power branch LS and auxiliary branch HS, wherein the direction of flow of the diodes is switched for this purpose in the direction of the power branch LS, wherein the main switch 4 is designed as a self-blocking N-channel MOSFET, which is electrically connected on the source side to the earth terminal ME, on the drain side to the power branch LS and on the gate side to an end of the auxiliary branch HS on the earth terminal side. In detail, it can be provided that the end of the auxiliary branch HS on the earth terminal side is connected to the earth terminal ME via an auxiliary ohmic resistor 5 and an end of the auxiliary branch HS on the voltage input side is directly connected to the voltage input SE, wherein a node K is formed between the auxiliary branch HS and the auxiliary ohmic resistor 5, which node is connected to the gate G4 of the main switch 4 in such a manner that if the auxiliary branch HS is blocked, the potential of the node K is changed such that the main switch 4 blocks and if the auxiliary branch HS is conductive, the potential of the node K is changed such that the main switch 4 conducts.

A common feature of the embodiments according to FIGS. 3 and 4 is that the transistors 3 of the auxiliary branch HS are designed as self-blocking P-channel MOSFETs, wherein an ohmic resistor is respectively connected in series between the transistors 3 and in each monitoring pair, the light source 2 and transistor 3 are coupled by virtue of the fact that the anode of the light source 2 is connected to the source of the transistor 3 and the cathode of the light source 2 is connected to the gate of the transistor 3, wherein those anode connections that start from connection points P located between light sources 2 are respectively provided with a diode determining the power flow between the power branch LS and auxiliary branch HS, wherein the direction of flow of the diodes is switched for this purpose in the direction of the power branch LS, wherein an end of the auxiliary branch HS on the earth terminal side is connected to the earth terminal ME via an auxiliary ohmic resistor 5 and an end of the auxiliary branch HS on the voltage input side is directly connected to the voltage input SE, wherein a node K is formed between the auxiliary branch HS and the auxiliary ohmic resistor 5, and the fault detection device 6 is electrically connected to this node K and thus detects a change in potential of the node K caused by blocking or conductivity of the auxiliary branch HS and, depending thereon, outputs an error signal.

In the embodiment according to FIG. 3, it is also provided that the fault detection device comprises an auxiliary transistor 10, which is turned on depending on the potential of the node, wherein the auxiliary transistor 10 is connected to an electrical control unit (ECU) via a temperature-dependent resistor 9, wherein the electrical control unit (ECU) detects the switching state of the auxiliary transistor 10 and, depending thereon, outputs an error signal. The temperature-dependent resistor 9 can, for example, come from an existing illumination device monitoring system, e.g. a temperature monitoring system. For example, it is common to attach the light sources 2 to a heat sink and record the temperature of the heat sink via a temperature-dependent resistor 9 connected to an ECU. The current can be controlled depending on the measured temperature. For example, it can be provided that from a temperature of 110° C., the actual current is reduced compared to the rated current and, for example, at a temperature of 130° C., only half of the rated current is reached in order to avoid or at least slow down further heating. Such a temperature monitoring device can be part of the present illumination device and thus be combined with the short circuit detection by using the temperature-dependent resistor and the ECU already provided for temperature monitoring. If a short circuit is detected, the auxiliary transistor 10 switches off and ensures that the temperature-dependent resistor (e.g. in the form of an NTC) provided for measuring the temperature of, for example, a printed circuit board or a heat sink is used for a second purpose beyond temperature measurement, namely switched to "open load", which can trigger error routines in the downstream ECU.

In FIG. 4, it is provided that the fault detection device 6 comprises an auxiliary transistor 10, which is turned on depending on the potential of the node K, wherein the switching state of the auxiliary transistor 10 is used to output a binary error signal.

The invention further relates to a vehicle headlight not shown in the figures.

The invention is not limited to the embodiments shown, but is defined by the entire scope of protection of the claims. Individual aspects of the invention or embodiments may also be adopted and combined with each other. Any reference numbers in the claims are exemplary and merely serve to make the claims easier to read, without limiting them.

The invention claimed is:

1. A short-circuit fault detection illumination device (1) for a motor vehicle headlight, comprising:
   a voltage input (SE) and a terminal (ME) for connection to earth potential;
   a power branch (LS) supplied via the voltage input (SE), which comprises a number of light sources (2) which are configured to be monitored, wherein this number is at least two, wherein the light sources (2) are designed to emit light of the short-circuit fault detection illumination device (1) and the light sources (2) are connected to one another in series within the power branch (LS); and
   an auxiliary branch (HS) with transistors (3) arranged therein and connected to one another in series, wherein each of the light sources (2) of the power branch (LS) is associated with one of the transistors (3), and thus a monitoring pair (P1, P2, P3, P4), consisting of one of the light sources (2) which are configured to be monitored and one of the transistors (3) assigned for monitoring, is formed, wherein each one of the transistors (3) is coupled to the cathode and anode of one of the light sources (2) in such a manner that the voltage that drops across the light source (2) in normal operation is used to connect the transistor (3), and in the event of a short circuit of the light source (2), the voltage drop caused by the short circuit leads to a blocking of the transistor (3) and thus of the auxiliary branch (HS),
   wherein the short-circuit fault detection illumination device (1) further has a fault detection device (6) coupled to the auxiliary branch (HS), which is designed to output an error signal ($S_F$) or trigger an error routine (FR) in the event of the auxiliary branch being blocked,
   wherein the fault detection device (6) is designed to carry out a fault routine (FR), in which the operation of the light sources (2) is automatically switched off if a fault is detected, wherein it is provided that both the power branch (LS) and the auxiliary branch (HS) extend between the voltage input (SE) and the earth terminal (ME) and the fault detection device (6) is designed as a main switch (4), which is arranged in series with the power branch (LS) and is coupled to the auxiliary branch (HS) in such a way that if the auxiliary branch (HS) is connected, the main switch (4) is electrically conductive and, if the auxiliary branch (HS) is blocked, it is electrically blocking, and
   wherein the transistors (3) of the auxiliary branch (HS) are designed as npn bipolar transistors, wherein an ohmic resistor is respectively connected in series between the transistors (3) and in each monitoring pair (P1, P2, P3, P4), the light source (2) and transistor (3) are coupled by virtue of the fact that the anode of the light source (2) is connected to the base of the transistor and the cathode of the light source (2) is connected to the emitter of the transistor (3), wherein those connections that start from connection points (P) located between light sources (2) are respectively provided with a diode (7) determining the power flow between the power branch (LS) and auxiliary branch (HS), wherein the direction of flow of the diodes (7) is switched for this purpose in the direction of the auxiliary branch in the form of the transistor (3) of the respective monitoring pair (P1, P2, P3, P4), wherein the main switch (4) is designed as a self-blocking P-channel MOSFET (metal oxide semiconductor field effect transistor), which is electrically connected on the source side (S4) to the voltage input (SE), on the drain side (D4) to the power branch (LS) and on the gate side (G4) to an end of the auxiliary branch (HS) on the voltage input side.

2. The short-circuit fault detection illumination device (1) according to claim 1, wherein the end of the auxiliary branch (HS) on the voltage input side is connected to the voltage input via an auxiliary ohmic resistor (5) and an earth end of the auxiliary branch is connected to the earth terminal (ME), wherein a node (K) is formed between the auxiliary branch (HS) and the auxiliary ohmic resistor (5), which node is connected to the gate (G4) of the main switch (4) in such a manner that if the auxiliary branch (HS) is blocked, the potential of the node (K) is changed such that the main switch (4) blocks and if the auxiliary branch (HS) is conductive, the potential of the node (K) is changed such that the main switch (4) conducts.

3. The short-circuit fault detection illumination device (1) according to claim 1, wherein the transistors (3) of the auxiliary branch (HS) are designed as self-blocking MOSFET transistors.

4. The short-circuit fault detection illumination device (1) according to claim 3, wherein the transistors (3) of the auxiliary branch (HS) are designed as self-blocking N-channel MOSFETs, wherein an ohmic resistor (8) is respectively connected in series between the transistors (3) and in each monitoring pair (P1, P2, P3, P4), the light source (2) and transistor (3) are coupled by virtue of the fact that the anode of the light source (2) is directly connected to the gate of the transistor (3) and the cathode of the light source (2) is connected to the drain of the transistor (3), wherein those cathode connections that start from connection points (P) located between light sources (2) are respectively provided with a diode determining the power flow between the power branch (LS) and auxiliary branch (HS), wherein the direction of flow of the diodes is switched for this purpose in the direction of the auxiliary branch (HS) in the form of the transistor (3) of the respective monitoring pair (P1, P2, P3, P4), wherein the main switch (4) is designed as a self-blocking P-channel MOSFET, which is electrically connected on the source side to the voltage input (SE), on the drain side to the power branch and on the gate side to an end of the auxiliary branch on the voltage input side.

5. The short-circuit fault detection illumination device (1) according to claim 4, wherein the end of the auxiliary branch (HS) on the voltage input side is connected to the voltage input (SE) via an auxiliary ohmic resistor (5) and an earth end of the auxiliary branch (HS) is connected to the earth terminal (ME), wherein a node (K) is formed between the auxiliary branch (HS) and the auxiliary ohmic resistor (5), which node is connected to the gate (G4) of the main switch (4) in such a manner that if the auxiliary branch (HS) is blocked, the potential of the node (K) is changed such that the main switch (4) blocks and if the auxiliary branch (HS) is conductive, the potential of the node (K) is changed such that the main switch (4) conducts.

6. The short-circuit fault detection illumination device (1) according to claim 3, wherein the transistors (3) of the auxiliary branch (HS) are designed as self-blocking P-channel MOSFETs, wherein an ohmic resistor is respectively connected in series between the transistors (3) and in each monitoring pair, the light source (2) and transistor (3) are coupled by virtue of the fact that the anode of the light source (2) is connected to the source of the transistor (3) and the cathode of the light source (2) is connected to the gate of the transistor (3), wherein those anode connections that start from connection points (P) located between light sources (2) are respectively provided with a diode determining the power flow between the power branch (LS) and auxiliary branch (HS), wherein the direction of flow of the diodes is switched for this purpose in the direction of the power branch (LS), wherein the main switch (4) is designed as a self-blocking N-channel MOSFET, which is electrically connected on the source side to the earth terminal (ME), on the drain side to the power branch (LS) and on the gate side to an end of the auxiliary branch (HS) on the earth terminal side.

7. The short-circuit fault detection illumination device (1) according to claim 6, wherein the end of the auxiliary branch (HS) on the earth terminal side is connected to the earth terminal (ME) via an auxiliary ohmic resistor (5) and an end of the auxiliary branch (HS) on the voltage input side is directly connected to the voltage input (SE), wherein a node (K) is formed between the auxiliary branch (HS) and the auxiliary ohmic resistor (5), which node is connected to the gate (G4) of the main switch (4) in such a manner that if the auxiliary branch (HS) is blocked, the potential of the node (K) is changed such that the main switch (4) blocks and if the auxiliary branch (HS) is conductive, the potential of the node (K) is changed such that the main switch (4) conducts.

8. The short-circuit fault detection illumination device (1) according to claim 1, wherein the transistors (3) of the auxiliary branch (HS) are designed as self-blocking P-channel MOSFETs, wherein an ohmic resistor is respectively connected in series between the transistors (3) and in each monitoring pair, the light source (2) and transistor (3) are coupled by virtue of the fact that the anode of the light source (2) is connected to the source of the transistor (3) and the cathode of the light source (2) is connected to the gate of the transistor (3), wherein those anode connections that start from connection points (P) located between light sources (2) are respectively provided with a diode determining the power flow between the power branch (LS) and auxiliary branch (HS), wherein the direction of flow of the diodes is switched for this purpose in the direction of the power branch (LS), wherein an end of the auxiliary branch (HS) on the earth terminal side is connected to the earth terminal (ME) via an auxiliary ohmic resistor (5) and an end of the auxiliary branch (HS) on the voltage input side is directly connected to the voltage input (SE), wherein a node (K) is formed between the auxiliary branch (HS) and the auxiliary ohmic resistor (5), and the fault detection device (6) is electrically connected to this node (K) and thus detects a change in potential of the node (K) caused by blocking or conductivity of the auxiliary branch (HS) and, depending thereon, outputs an error signal.

9. The short-circuit fault detection illumination device (1) according to claim 8, wherein the fault detection device comprises an auxiliary transistor (10), which is turned on depending on the potential of the node, wherein the auxiliary transistor (10) is connected to an electrical control unit (ECU) via a temperature-dependent resistor (9), wherein the electrical control unit (ECU) detects the switching state of the auxiliary transistor (10) and, depending thereon, outputs an error signal.

10. The short-circuit fault detection illumination device (1) according to claim 8, wherein the fault detection device (6) comprises an auxiliary transistor (10), which is turned on depending on the potential of the node (K), wherein the switching state of the auxiliary transistor (10) is used to output a binary error signal.

11. A vehicle headlight comprising:
the short-circuit fault detection illumination device according to claim 1.

12. A short-circuit fault detection illumination device (1) for a motor vehicle headlight, comprising:
a voltage input (SE) and a terminal (ME) for connection to earth potential;
a power branch (LS) supplied via the voltage input (SE), which comprises a number of light sources (2) to be monitored, wherein this number is at least two, wherein the light sources (2) are designed to emit light of the illumination device (1) and the light sources (2) are connected to one another in series within the power branch (LS); and
an auxiliary branch (HS) with transistors (3) arranged therein and connected to one another in series, wherein each of the light sources (2) of the power branch (LS) is associated with one of the transistors (3), and thus a monitoring pair (P1, P2, P3, P4), consisting of one of the light sources (2) to be monitored and one of the transistors (3) assigned for monitoring, is formed, wherein each one of the transistors (3) is coupled to the cathode and anode of one of the light sources (2) in such a manner that the voltage that drops across the light source (2) in normal operation is used to connect the transistor (3), and in the event of a short circuit of the light source (2), the voltage drop caused by the short circuit leads to a blocking of the transistor (3) and thus of the auxiliary branch (HS),
wherein the short-circuit fault detection illumination device (1) further has a fault detection device (6) coupled to the auxiliary branch (HS), which is designed to output an error signal ($S_F$) or trigger an error routine (FR) in the event of the auxiliary branch being blocked,
wherein the transistors (3) of the auxiliary branch (HS) are designed as self-blocking MOSFET transistors, which are self-blocking N-channel MOSFETs, wherein an ohmic resistor (8) is respectively connected in series between the transistors (3) and in each monitoring pair (P1, P2, P3, P4), the light source (2) and transistor (3) are coupled by virtue of the fact that the anode of the light source (2) is directly connected to the gate of the transistor (3) and the cathode of the light source (2) is connected to the drain of the transistor (3), wherein those cathode connections that start from connection points (P) located between light sources (2) are respectively provided with a diode determining the power flow between the power branch (LS) and auxiliary branch (HS), wherein the direction of flow of the diodes is switched for this purpose in the direction of the auxiliary branch (HS) in the form of the transistor (3) of the respective monitoring pair (P1, P2, P3, P4), wherein the main switch (4) is designed as a self-blocking P-channel MOSFET, which is electrically connected on the source side to the voltage input (SE), on the drain side to the power branch and on the gate side to an end of the auxiliary branch on the voltage input side.

13. A short-circuit fault detection illumination device (1) for a motor vehicle headlight, comprising:
a voltage input (SE) and a terminal (ME) for connection to earth potential;
a power branch (LS) supplied via the voltage input (SE), which comprises a number of light sources (2) to be monitored, wherein this number is at least two, wherein the light sources (2) are designed to emit light of the illumination device (1) and the light sources (2) are connected to one another in series within the power branch (LS); and
an auxiliary branch (HS) with transistors (3) arranged therein and connected to one another in series, wherein each of the light sources (2) of the power branch (LS) is associated with one of the transistors (3), and thus a monitoring pair (P1, P2, P3, P4), consisting of one of the light sources (2) to be monitored and one of the transistors (3) assigned for monitoring, is formed, wherein each one of the transistors (3) is coupled to the cathode and anode of one of the light sources (2) in such a manner that the voltage that drops across the light source (2) in normal operation is used to connect the transistor (3), and in the event of a short circuit of the light source (2), the voltage drop caused by the short circuit leads to a blocking of the transistor (3) and thus of the auxiliary branch (HS),
wherein the short-circuit fault detection illumination device (1) further has a fault detection device (6) coupled to the auxiliary branch (HS), which is designed to output an error signal ($S_F$) or trigger an error routine (FR) in the event of the auxiliary branch being blocked, and
wherein the transistors (3) of the auxiliary branch (HS) are designed as self-blocking P-channel MOSFETs, wherein an ohmic resistor is respectively connected in series between the transistors (3) and in each monitoring pair, the light source (2) and transistor (3) are coupled by virtue of the fact that the anode of the light source (2) is connected to the source of the transistor (3) and the cathode of the light source (2) is connected to the gate of the transistor (3), wherein those anode connections that start from connection points (P) located between light sources (2) are respectively provided with a diode determining the power flow between the power branch (LS) and auxiliary branch (HS), wherein the direction of flow of the diodes is switched for this purpose in the direction of the power branch (LS), wherein an end of the auxiliary branch (HS) on the earth terminal side is connected to the earth terminal (ME) via an auxiliary ohmic resistor (5) and an end of the auxiliary branch (HS) on the voltage input side is directly connected to the voltage input (SE), wherein a node (K) is formed between the auxiliary branch (HS) and the auxiliary ohmic resistor (5), and the fault detection device (6) is electrically connected to this node (K) and thus detects a change in potential of the node (K) caused by blocking or conductivity of the auxiliary branch (HS) and, depending thereon, outputs an error signal.

* * * * *